United States Patent
Konzelmann et al.

(10) Patent No.: US 7,360,414 B2
(45) Date of Patent: *Apr. 22, 2008

(54) DEVICE FOR DETERMINING AT LEAST ONE PARAMETER OF A MEDIUM FLOWING IN A CONDUIT AND HAVING A SEPARATION OPENING IN THE BYPASS PASSAGE

(75) Inventors: Uwe Konzelmann, Asperg (DE); Henning Marberg, Weil der Stadt (DE); Christoph Gmelin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 30 days.

This patent is subject to a terminal disclaimer.

(21) Appl. No.: 10/564,459

(22) PCT Filed: Jun. 18, 2004

(86) PCT No.: PCT/DE2004/001270

§ 371 (c)(1),
(2), (4) Date: Jul. 19, 2006

(87) PCT Pub. No.: WO2005/008189

PCT Pub. Date: Jan. 27, 2005

(65) Prior Publication Data

US 2007/0062276 A1    Mar. 22, 2007

(30) Foreign Application Priority Data

Jul. 14, 2003   (DE) ............................... 103 31 753
May 6, 2004   (DE) ..................... 10 2004 022 271

(51) Int. Cl.
*G01F 1/68* (2006.01)

(52) U.S. Cl. ................................. 73/202.5; 73/204.21
(58) Field of Classification Search .............. 73/202.5, 73/204.22
See application file for complete search history.

(56) References Cited

U.S. PATENT DOCUMENTS 5,485,746 A    1/1996   Mori et al.

(Continued)

FOREIGN PATENT DOCUMENTS

DE    101 35 142    10/2002

(Continued)

*Primary Examiner*—Harshad Patel
(74) *Attorney, Agent, or Firm*—Kenyon & Kenyon LLP

(57) ABSTRACT

Devices for determining at least one parameter of a medium flowing in a conduit, in particular for determining the air-mass flow in the intake tract of an internal combustion engine, including a conduit member and sensor device having a bypass section are already known. To prevent flow detachment at the side walls of the bypass section, it is proposed that a flow guide wall running substantially parallel to the side wall provided with the separation opening of the bypass section be arranged in the conduit member behind the separation opening, as viewed in the main flow direction; the length dimension b of the flow guide wall, as viewed in the main flow direction, being equal to or greater than the distance a of the separation opening from the rear wall; and the distance c of the flow guide wall from the center axis of the conduit member being greater than or equal to the distance d of the side wall provided with the separation opening of the bypass section from the center axis.

12 Claims, 5 Drawing Sheets

U.S. PATENT DOCUMENTS

| | | |
|---|---|---|
| 5,948,975 A | 9/1999 | Tank et al. |
| 6,185,998 B1 | 2/2001 | Uramachi et al. |
| 7,162,920 B2 * | 1/2007 | Konzelmann et al. ..... 73/202.5 |
| 2007/0062275 A1 * | 3/2007 | Beyrich et al. .......... 73/204.21 |

FOREIGN PATENT DOCUMENTS

| | | |
|---|---|---|
| EP | 0 803 712 | 10/1997 |

* cited by examiner

DEVICE FOR DETERMINING AT LEAST ONE PARAMETER OF A MEDIUM FLOWING IN A CONDUIT AND HAVING A SEPARATION OPENING IN THE BYPASS PASSAGE

FIELD OF THE INVENTION

The present invention relates to a device for determining at least one parameter of a medium flowing in a conduit.

BACKGROUND INFORMATION

A device of this type is known, for example, from German Published Patent Application No. 101 35 142 and is used, for example, in the intake tract of an internal combustion engine to determine the air-mass flow passed through a conduit to the internal combustion engine. A portion of a sensor device provided with a bypass section is inserted into the conduit member through an insertion opening. The bypass section features a channel structure having an inlet region from which a measuring channel provided with a measuring element branches off. The inlet region further has a separation zone having at least one separation opening which opens into the conduit passage at at least one side wall of the bypass section. The separation zone is used to remove liquid and/or solid particles from the channel structure, thereby preventing them from entering the measuring channel and contaminating the measuring element provided therein.

The bypass section inserted in the conduit has edges which are formed by the front side facing the main flow direction and the side walls and which, in the known devices, form impingement edges where regions of detached flow are formed. These regions of detached flow can cause, on the one hand, high pressures losses and, on the other hand, unintentional flow pulsation, as a result of which pressure fluctuations are transmitted through the separation opening to the measuring channel branching off from the inlet region. The pressure fluctuations in the measuring channel can significantly corrupt the output signal of the measuring element.

SUMMARY OF THE INVENTION

The device of the present invention for determining at least one parameter of a medium flowing in a conduit has the advantage over the related art that the regions of detached flow at the side walls of the bypass section are considerably reduced in size because the flow returns sooner into contact with the side wall provided with the separation opening, as viewed in the main flow direction, thereby reducing pressure losses in the area of the side wall provided with the separation opening and preventing unwanted flow pulsations. The flow guide wall located behind the separation opening, as viewed in the main flow direction, requires only little additional manufacturing effort and can, for example, be economically injection-molded with the conduit member to form a single piece.

For example, in one advantageous exemplary embodiment, only one flow guide wall is provided which is located on the same side as the side wall provided with the separation opening with respect to the center axis of the conduit member, resulting in an asymmetric configuration downstream of the separation opening. This is based on the idea that complete prevention of flow detachment is more difficult to achieve than localizing the flow detachment to one side of the bypass section which is not the side provided with the separation opening.

The flow guide wall can be arranged immediately behind of the rear wall of the bypass section, as viewed in the main flow direction, and can have an aerodynamically favorable contour.

It is particularly advantageous if the difference between the distance of the flow guide wall from the center axis of the conduit member and the distance of the side wall provided with the separation opening of the bypass section from the center axis is less than 10 mm, and preferably less than 5 mm, but greater than zero. In this manner, the flow guide wall is laterally offset from the side wall relative to the center axis, thus providing a gap between the side wall and the flow guide wall. The detached flow forms a wake behind the rear wall of the bypass section. A negative pressure present in the wake, as compared to the pressure in the area of the side walls of the bypass section, draws the flow from the detachment region at the side wall provided with the separation opening through the gap into the wake behind the rear wall of the bypass section, as a result of which the detachment region at the side wall provided with the separation opening is advantageously further reduced in size.

It is also advantageous to combine the flow guide wall with a flow deflector element located before the bypass section, as viewed in the main flow direction; the flow deflector element having at least one deflection surface which faces the main flow direction and which, starting at an apex line spaced apart from the bypass section, is uniformly curved on both sides toward the two side walls in such a manner that the ends of the deflection surface which face away from the apex line are flush with the side walls. Additionally, a turbulence-generating structure may be provided on, or at least in the immediate proximity of, the deflection surface of the bypass section, at least before the side wall provided with the separation opening, as viewed in the main flow direction; this structure generating turbulences in the boundary layer of the flow at this side wall of the bypass section. The combination of the flow guide wall behind the bypass section with the flow deflector element before the bypass section largely prevents flow detachment on the side wall provided with the separation opening of the bypass section.

In the case of large inside diameters of the conduit member, disadvantageous flow detachments can occur on the outer surfaces of the flow guide wall due to the low flow velocities (very small Reynolds numbers in relation to the length dimension of the flow guide wall in the main flow direction) and because of the low flow acceleration at the location of the sensor device; the flow detachments in turn being capable of causing pulsations. To avoid this, it is advantageous for the flow guide wall to be provided, at least on one outer surface, with turbulence-generating structures formed, for example, by a row of projections which are preferably arranged periodically along a line and protrude from the outer surface of the flow guide wall, and which are preferably located in the portion of the flow guide wall facing the main flow direction and, in particular, form a comb-like, battlement-like, or jagged pattern. The projections make the flow boundary layer turbulent, causing increased momentum exchange between slower and faster portions of the flow. The turbulences generated counteract a detachment from the flow guide wall, thereby making it possible to prevent unwanted detachment regions at the flow guide wall.

DETAILED DESCRIPTION

Figure 1:
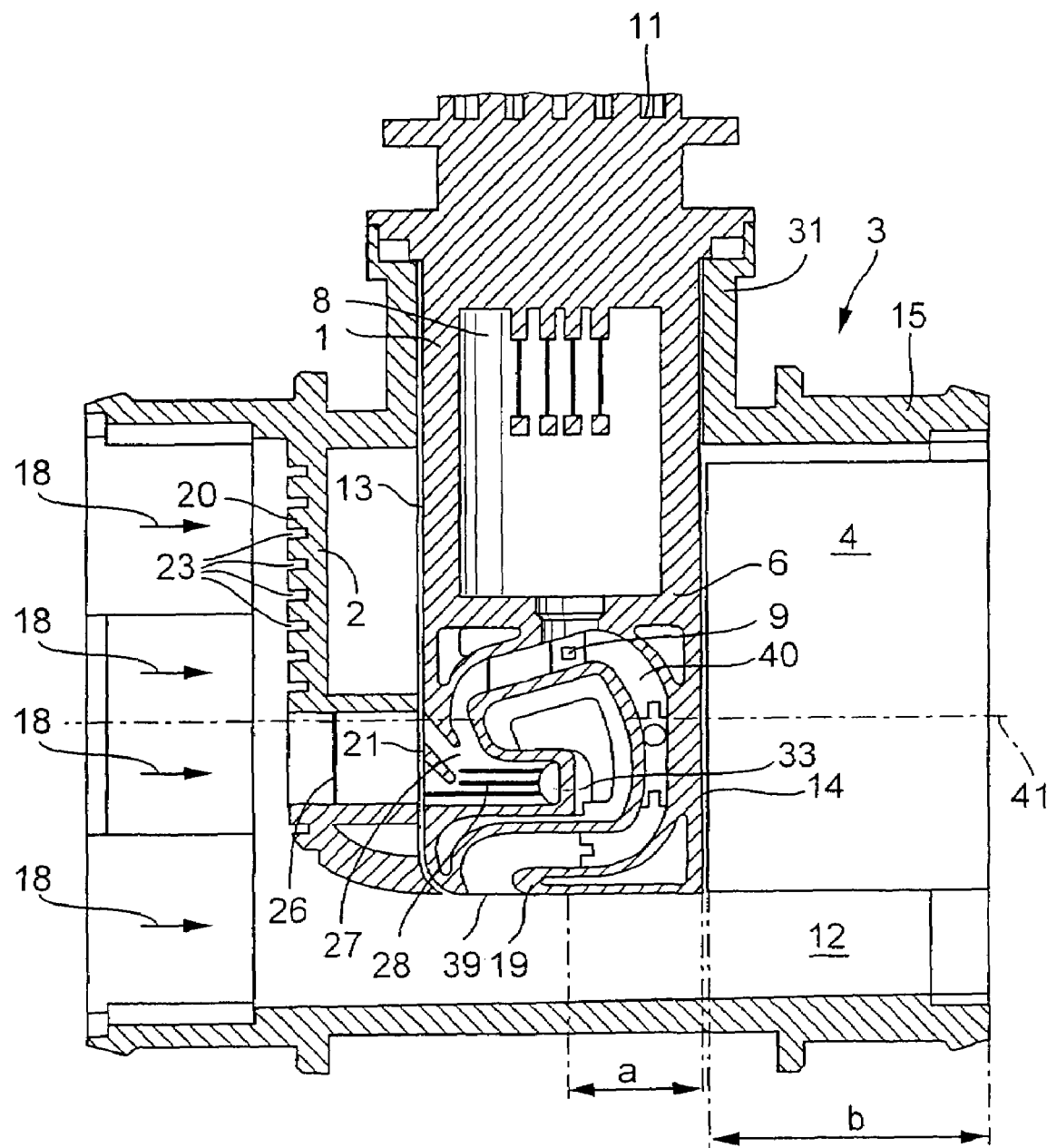
FIG. 1 is a cross-section through an exemplary embodiment of the device according to the present invention.

FIG. 1 shows a conduit member 3 having an approximately cylinder jacket-shaped wall 15 which surrounds a conduit passage 12 in which a medium flows in a main flow direction. In FIG. 1, the main flow direction is from left to right and is marked by corresponding arrows 18. The main flow direction is defined as the direction in which the medium mainly flows through the conduit passage, from the inlet to the outlet of conduit member 3, even if locally forming vortices and local regions of detached flow have differences in the flow from the main flow direction or if temporary changes in direction occur. Here, the main flow direction runs parallel to center axis 41 of cylinder jacket-shaped wall 15 of conduit member 3. Conduit member 3 can be inserted, for example, into an intake pipe of an internal combustion engine. The medium is, for example, the air flowing to the internal combustion engine.

A sensor device 1 is mounted on conduit member 3 in such a manner that a bypass section 6 provided with a channel structure of the sensor device extends in a finger-like manner into conduit passage 12 where it is exposed to the flowing medium in a predetermined alignment. When inserting bypass section 6 into conduit 3, it is guaranteed that it has a predetermined alignment with respect to main flow direction 18 of the medium. Sensor device 1 further includes an electrical connection 11 and a holder for a carrier member 8 which is connected to connection 11 and on which are located, for example, evaluation electronics. The sensor device can be inserted with bypass section 6 into conduit passage 12 through an insertion opening in wall 15 of conduit member 3. Carrier member 8 including the evaluation electronics can be located inside and/or outside of conduit passage 12.

Sensor device 1 contains a measuring element 9, such as a thin-film measuring element having a sensor diaphragm with a heating resistor and two temperature-dependent resistors, which is located on a measuring element holder in a measuring channel 40 and whose measured data can be analyzed by the evaluation electronics. Measuring element 9 is used to determine, as a parameter, for example, the volume flow rate or the mass flow rate of the flowing medium, especially the air-mass flow. Other measurable parameters include, for example, pressure, temperature, the concentration of a medium component or the flow velocity, which are determined using suitable sensor elements.

Bypass section 6 has a housing having a, for example, rectangular parallelepiped configuration, including a front wall 13 which, when in the installed position, faces main flow direction 18 of the medium, and a rear wall 14 facing away therefrom, a first side wall 17 and a second side wall 16 parallel to the first wall, as well as a third wall 19 which is located at the end inserted into the conduit and which runs, for example, parallel to the main flow direction. Moreover, section 6 is provided inside with a channel structure having an inlet region 27 and a measuring channel 40 branching off from inlet region 27. A partial flow of the medium flowing in main flow direction 18 enters inlet region 27 of the channel structure through an opening 21 at front side 13 of bypass section 6. From inlet region 27, part of the medium enters measuring channel 40 provided with measuring element 9, and part of the medium flows further into a separation zone 28 which is located downstream of the branch point for the measuring channel and opens into conduit passage 12 through at least one separation opening 33 provided in first side wall 16 and/or second side wall 17. In the exemplary embodiment shown in FIG. 1, separation opening 33 is located parallel to main flow direction 18. A first partial flow of the medium that has entered inlet region 27 flows entirely into measuring channel 40 and exits it through outlet 39 at wall 19. A second partial flow flows entirely through the one separation opening 33 and back into conduit member 3. The flowing medium contains, for example, liquid and/or solid particles, such as oil or water particles, which can contaminate or damage measuring element 9. Due to separation opening 33 and the geometric configuration of the channel structure in the inlet region, the liquid and solid particles do not enter the measuring channel, but flow back into conduit passage 12.

Figure 2:
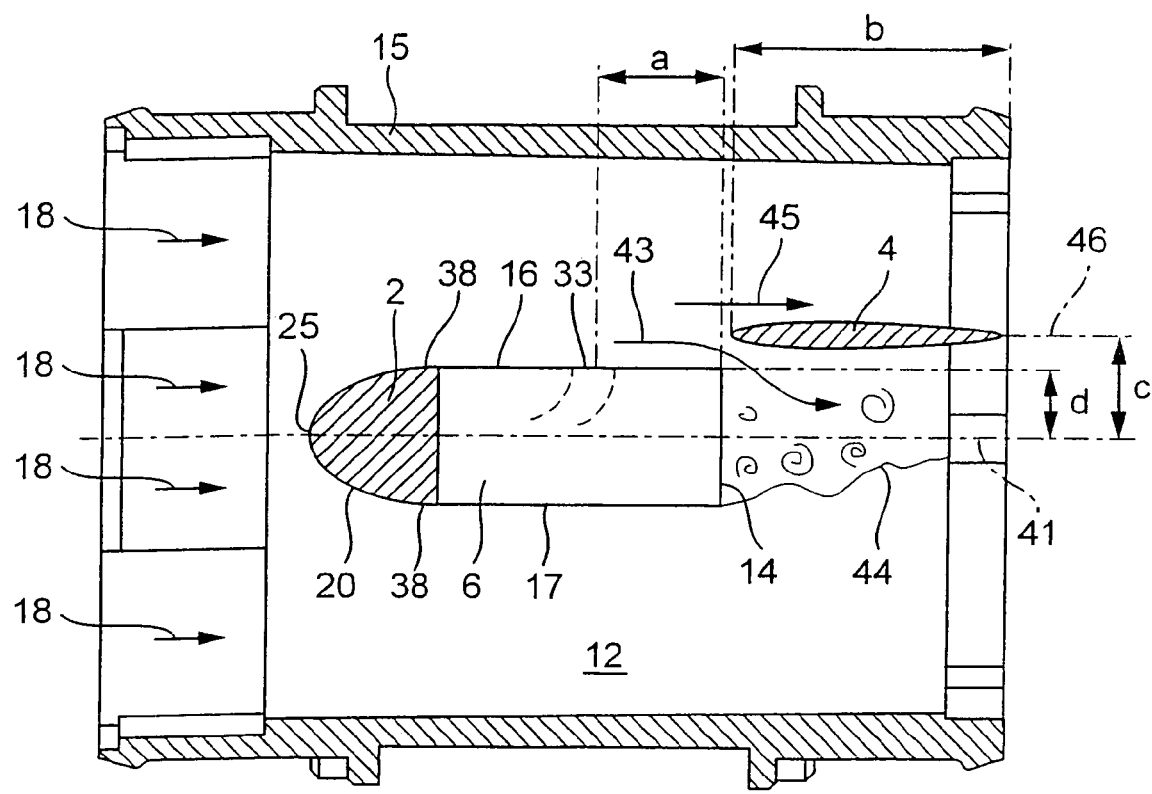
FIG. 2 shows a cross-section through FIG. 1.
Figure 3:
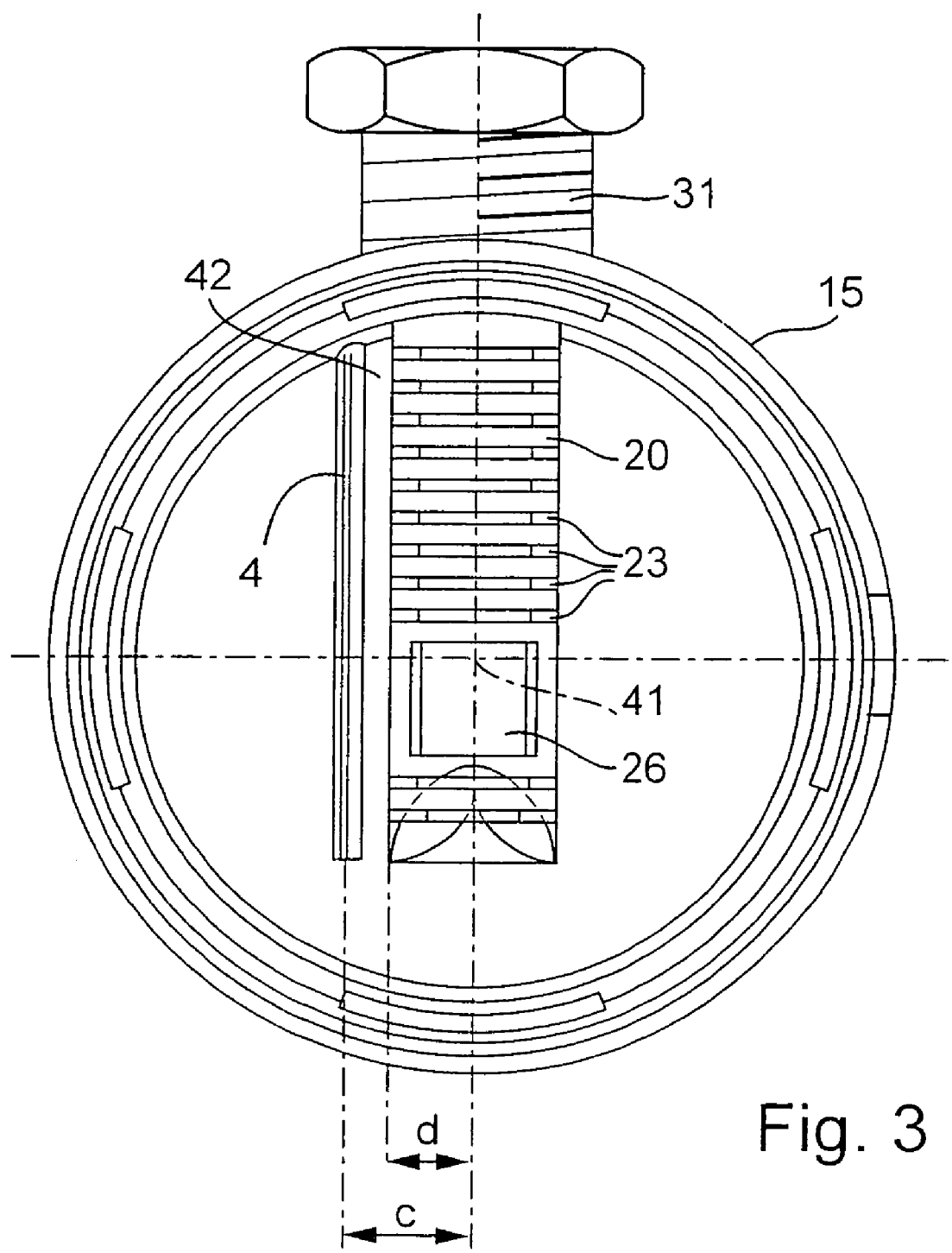
FIG. 3 is a top view of the exemplary embodiment of FIG. 1.

As can be seen in FIGS. 1 through 3, a flow guide wall 4 is located in conduit member 3, preferably immediately or nearly immediately (very small distance) behind rear wall 14 of bypass section 6, as viewed in main flow direction 18; the flow guide wall running substantially parallel to side wall 16 provided with separation opening 33 of bypass section 6. It is also possible for flow guide wall 4 in FIG. 2 to be located at a further upstream position behind separation opening 33 instead of behind rear wall 14 of bypass section 6. The contour of flow guide wall 4 can be shaped differently. The aerodynamically favorable contour shown in FIG. 2 is advantageous. In this connection, it should be noted that flow guide wall 4, which is substantially parallel to side wall 16, does not necessarily have to have two flat outer surfaces. The contour of the outer surfaces can also be slightly curved, as is shown in FIG. 2. However, it can be seen that centerline 46 of flow guide wall 4 runs parallel to side wall 16 and has a distance c from center axis 41 of conduit member 3. The centerline of the flow guide wall can also run at an angle of less than +/−15° to the side wall. In the context of this application, therefore, a flow guide wall which runs approximately parallel to the side wall is understood to be a flow guide wall whose centerline, in the cross-section of FIG. 2, runs parallel or at an angle of less than 15° to side wall 16, and thus also to main flow direction 18 since the main flow direction is parallel to side wall 16. Length dimension b of flow guide wall 4, as viewed in main flow direction 18, is equal to or greater than distance a of separation opening 33 from rear wall 14. For example, distance a is 10 mm and length dimension b is between 20 and 50 mm. The greater length dimension b, the better. However, length dimension b of the flow guide wall is limited by the length of conduit member 3.

Figure 4:
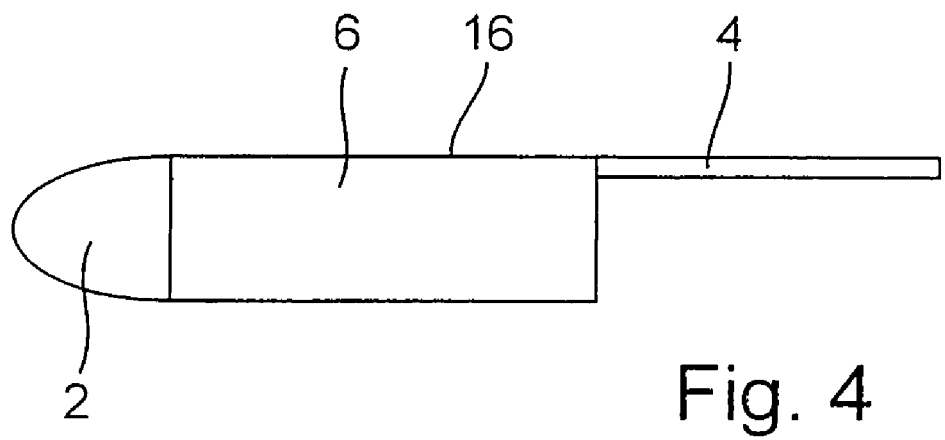
FIGS. 4, 5 and 6 are cross-sections through a sensor device and a flow guide wall for further exemplary embodiments of the present invention.
Figure 5:
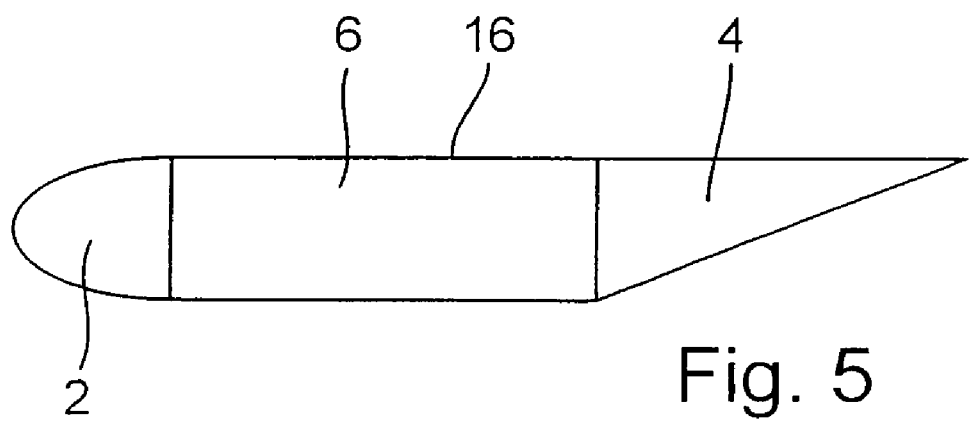
Figure 6:
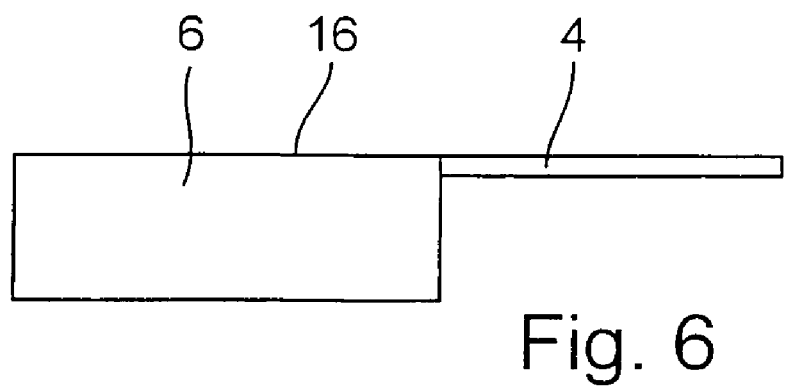

As can also be seen in FIG. 2, in this exemplary embodiment, distance c of centerline 46 of flow guide wall 4 from center axis 41 of conduit member 3 is greater than distance d of side wall 16 provided with separation opening 33 of bypass section 6 from center axis 41. This results in a gap 42 through which a medium flow 43 can reach wake 44 behind bypass section 6. The difference between distance c of flow guide wall 4 from center axis 41 and distance d of side wall 16 provided with separation opening 33 from center axis 41 is advantageously less than 10 mm, and preferably less than 5 mm and greater than 1 mm. However, difference c–d can also be zero. This is shown in the exemplary embodiments of FIGS. 4, 5 and 6, where flow guide wall 4 is located in a common plane with side wall 16 provided with separation opening 33. In these cases, no gap exists between side wall 16 and flow guide wall 4. However, the arrangement of flow guide wall 2 with the gap, which is shown in FIG. 2, is particularly advantageous.

As can be seen in FIG. 2, only one flow guide wall 4 is provided which is located on the same side as side wall 16 provided with separation opening 33 with respect to center axis 41 of conduit member 3. The air flowing along side walls 16, 17 detaches at the edge formed by rear wall 14 and side wall 17, resulting in a wake as shown in FIG. 2. Due to a negative pressure in the wake, as compared to the pressure conditions in the area of side walls 16, 17, part of the air on side wall 16 opposite of side wall 17 is drawn (reference numeral 43) through gap 42 between flow guide wall 4 and rear wall 14 into the wake, as a result of which the detachment region on side wall 16 provided with separation opening 33 is advantageously reduced in size. In the exemplary embodiments of FIGS. 4, 5 and 6, the detachment region on side wall 16 is also reduced in size, although not to the extent as in the exemplary embodiment shown in FIG. 2, at least by the detached flow returning sooner into contact with fluid guide wall 4.

Additionally, as is further shown in FIG. 1 and FIG. 2, a flow deflector element 2 may be disposed in conduit member 3 at a position immediately before bypass section 6, as viewed in main flow direction 18. Flow deflector element 2 is manufactured as a separate part, but can also be connected to sensor device 1 to form a single piece. The flow deflector element has a deflection surface 20 facing main flow direction 18. As can best be seen in FIG. 2, deflection surface 20, starting at an apex line 25 spaced apart from bypass section 6 in a direction opposite to the main flow direction, is uniformly curved on both sides toward the two side walls 16, 17 in such a manner that the ends 38 of deflection surface 20 which face away from the apex line are flush with side walls 16, 17 (ends 38 continuously merge into side walls 16, 17 without forming an edge). In the preferred exemplary embodiment shown here, deflection surface 20 is elliptically curved. Flow deflector element 2 further has a passage opening 26, which is in alignment with opening 21 of inlet region 27 of the channel structure, so that a partial flow of the medium flow in main flow direction 18 passes through passage opening 26 and opening 21 into inlet region 27.

Moreover, a turbulence-generating structure 23 may be provided, as is shown in FIGS. 1 and 2. The turbulence-generating structure can be formed by an irregularity and/or unevenness (such as a small step, edge, rib, etc.) on, or at least in the immediate proximity of, the uniformly curved deflection surface of the flow deflector element, so that turbulences are generated in the boundary layer of the flow. In the exemplary embodiment shown in FIG. 1, the structure is formed by a plurality of slots 23 provided in deflection surface 20; the slots each being disposed in a plane extending perpendicular to side walls 16, 17 of bypass section 6 and parallel to main flow direction 18. Part of the medium flow impinging on deflection surface 20 is diverted along deflection surface 20 toward side walls 16, 17, but part of it enters slots 23 exits slots 23 at an angle to main flow direction 18, thereby generating strong longitudinal vortices which cause turbulences in the boundary layer flow at side walls 16, 17 so that the boundary layer is in any case made turbulent and prevented from detaching.

Due to the combination of flow deflector element 2 located before the bypass section with flow guide wall 4 located behind the bypass section, detachment regions on side wall 16 provided with separation opening 33 of the bypass section are reduced in size in a particularly reliable manner.

Figure 7:
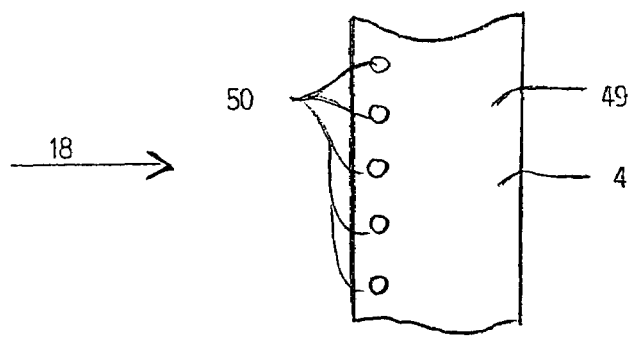
FIGS. 7 through 9 are side views of the flow guide wall with turbulence-generating structures.
Figure 8:
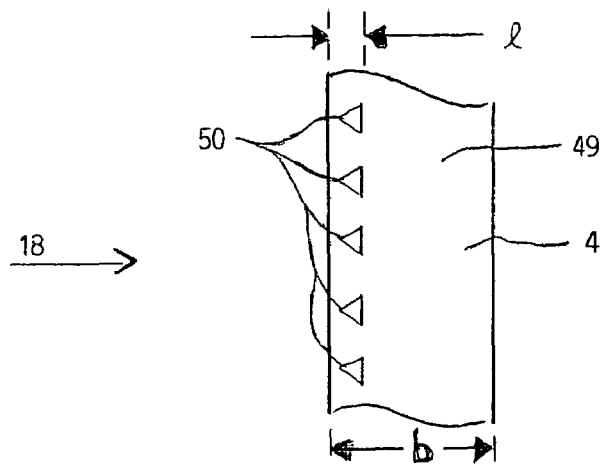
Figure 9:
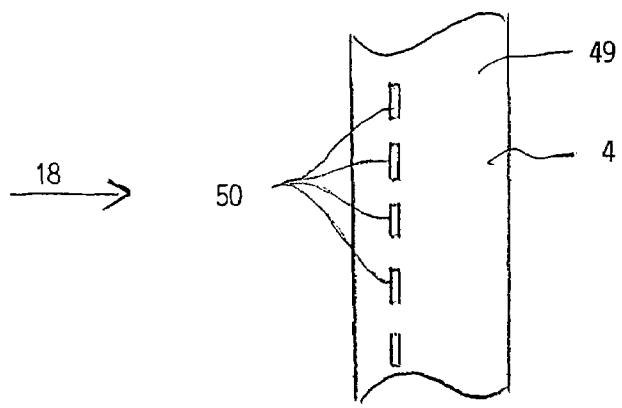

To prevent flow detachments on the outer surfaces of the flow guide wall, the two outer surfaces of the flow guide wall, which face away from each other, can be provided with turbulence-generating structures formed, for example, by a row of projections which are preferably arranged periodically along a line and protrude between 0.2 to 2 mm and preferably about 1 mm from outer surface 49 of flow guide wall 4. As shown in FIG. 7, FIG. 8 and FIG. 9, the structures can form a comb-like, battlement-like, or jagged pattern. As shown in FIG. 8, structures 50 are preferably located in the front portion of the flow guide wall. In particular, provision is made for the distance e of the structures from the end of flow guide wall 4 facing main flow direction 18 to be about 5% to 25% of length dimension b of flow guide wall 4. When manufacturing the flow guide wall as an injection-molded part, the structures can also be produced directly during the injection molding process.

What is claimed is:

1. A device for determining at least one parameter of a medium flowing in a conduit in a main flow direction, comprising:
   a conduit member that forms a conduit passage and includes a center axis running along the conduit passage;
   a sensor device including a bypass section arranged in the conduit member in such a manner that a partial flow of the medium flowing in the conduit member enters an inlet region of a channel structure formed in the bypass section, wherein:
      the inlet region includes a separation opening that opens into the conduit passage at at least one of two side walls of the bypass section running parallel to the center axis, and
      the separation opening is located at a distance from a downstream rear wall of the bypass section in the main flow direction; and
   a flow guide wall running at least approximately parallel to the side wall provided with the separation opening of the bypass section and being located in the conduit member behind the separation opening, as viewed in the main flow direction, wherein:
      a length dimension of the flow guide wall, as viewed in the main flow direction, is at least equal to the distance of the separation opening from the downstream rear wall, and
      a distance of the flow guide wall from the center axis of the conduit member is at least equal to a distance of the side wall provided with the separation opening of the bypass section from the center axis.

2. The device as recited in claim 1, wherein:
   only the flow guide wall is located on the same side as the side wall provided with the separation opening with respect to the center axis.

3. The device as recited in claim 1, wherein:
   the flow guide wall is located one of immediately and nearly immediately behind the downstream rear wall, as viewed in the main flow direction.

4. The device as recited in claim 1, wherein:
a difference between the distance of the flow guide wall from the center axis and the distance of the side wall provided with the separation opening from the center axis is less than 10 mm.

5. The device as recited in claim 1, wherein the flow guide wall has an aerodynamically favorable contour.

6. The device as recited in claim 1, further comprising:
a flow deflector element disposed in the conduit member upstream of the bypass section, as viewed in the main flow direction, wherein:
the flow deflector element includes at least one deflection surface that faces the main flow direction, and
the at least one deflection surface, starting at an apex line spaced apart from the bypass section, is uniformly curved on both sides toward the two side walls in such a manner that ends of the at least one deflection surface that face away from the apex line are flush with the two side walls.

7. The device as recited in claim 6, further comprising:
a turbulence-generating structure one of provided on and at least in an immediate proximity of the at least one deflection surface of the bypass section, at least before the side wall provided with the separation opening, as viewed in the main flow direction, wherein:
the turbulence-generating structure generates turbulences in a boundary layer of the flow at the side wall provided with the separation opening.

8. The device as recited in claim 7, wherein:
the flow guide wall includes at least one outer surface on which is arranged the turbulence-generating structure.

9. The device as recited in claim 8, wherein:
the turbulence-generating structure includes a row of projections that are arranged periodically along a line and protrude from the at least one outer surface of the flow guide wall, and
the turbulence-generating structure forms one of a comb-like, battlement-like structure and a jagged pattern.

10. The device as recited in claim 8, wherein:
the turbulence-generating structure is located on the first 5% to 25% of a length dimension of the flow guide wall in the main flow direction, as viewed from an end of the flow guide wall facing the main flow direction.

11. The device as recited in claim 1, wherein the device is for determining an air-mass flow in an intake tract of an internal combustion engine.

12. The device as recited in claim 1, wherein:
a difference between the distance of the flow guide wall from the center axis and the distance of the side wall provided with the separation opening from the center axis is less than 5 mm.

* * * * *